United States Patent
Wong et al.

(10) Patent No.: US 11,711,843 B2
(45) Date of Patent: Jul. 25, 2023

(54) BASE STATION, USER EQUIPMENT, CIRCUITRY, MOBILE TELECOMMUNICATIONS SYSTEM AND METHOD FOR INTERRUPT PROCESSING OF LOWER PRIORITY DATA TRANSMISSION

(71) Applicant: Sony Corporation, Tokyo (JP)

(72) Inventors: Shin Horng Wong, Basingstoke (GB); Martin Warwick Beale, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 230 days.

(21) Appl. No.: 17/260,566

(22) PCT Filed: Jul. 19, 2019

(86) PCT No.: PCT/EP2019/069542
§ 371 (c)(1),
(2) Date: Jan. 15, 2021

(87) PCT Pub. No.: WO2020/020784
PCT Pub. Date: Jan. 30, 2020

(65) Prior Publication Data
US 2021/0329663 A1    Oct. 21, 2021

(30) Foreign Application Priority Data

Jul. 25, 2018    (EP) .................................... 18185592

(51) Int. Cl.
*H04W 72/566* (2023.01)
*H04L 1/1812* (2023.01)
(Continued)

(52) U.S. Cl.
CPC ......... *H04W 72/569* (2023.01); *H04L 1/1819* (2013.01); *H04L 1/1896* (2013.01);
(Continued)

(58) Field of Classification Search
CPC ......... H04W 72/1242; H04W 72/0446; H04W 72/1263; H04W 72/1289; H04W 72/14; H04W 72/10; H04L 1/1819; H04L 1/1896
See application file for complete search history.

(56) References Cited

U.S. PATENT DOCUMENTS 9,516,591 B2 * 12/2016 Jheng .................. H04W 52/281
2002/0051466 A1 * 5/2002 Bruckman .............. H04L 47/10
370/465
(Continued)

FOREIGN PATENT DOCUMENTS

EP          3499996 A1    6/2019
WO     2018/028076 A1    2/2018
(Continued)

OTHER PUBLICATIONS

International Search Report and Written Opinion dated Oct. 25, 2019, received for PCT Application PCT/EP2019/069542, Filed on Jul. 19, 2019, 16 pages.

*Primary Examiner* — Jael M Ulysse
(74) *Attorney, Agent, or Firm* — Xsensus LLP

(57) ABSTRACT

A user equipment for a mobile telecommunications system has circuitry configured to communicate with at least one base station, wherein the circuitry is further configured to: interrupt processing of a lower priority data transmission when a higher priority data transmission has to be processed, when it is determined that an available processing power is below a predetermined threshold.

20 Claims, 8 Drawing Sheets

(51) Int. Cl.
*H04L 1/1867* (2023.01)
*H04W 72/0446* (2023.01)
*H04W 72/1263* (2023.01)
*H04W 72/23* (2023.01)

(52) U.S. Cl.
CPC ... *H04W 72/0446* (2013.01); *H04W 72/1263* (2013.01); *H04W 72/23* (2023.01)

(56) References Cited

U.S. PATENT DOCUMENTS

| | | | | |
|---|---|---|---|---|
| 2008/0205267 A1* | 8/2008 | El Barachi | .............. | H04L 65/80 370/462 |
| 2012/0263119 A1* | 10/2012 | Monogioudis | ........ | H04W 28/24 370/329 |
| 2013/0058315 A1* | 3/2013 | Feuersanger | ....... | H04W 52/346 370/336 |
| 2015/0326373 A1* | 11/2015 | Ryu | ...................... | H04L 5/0092 370/329 |
| 2016/0157268 A1* | 6/2016 | Wakabayashi | ........ | H04W 24/10 370/329 |
| 2016/0205025 A1* | 7/2016 | Wakabayashi | .... | H04W 52/0222 370/235 |
| 2017/0013565 A1* | 1/2017 | Pelletier | .............. | H04W 52/146 |
| 2017/0230939 A1* | 8/2017 | Rudolf | ................ | H04W 72/569 |
| 2018/0184431 A1* | 6/2018 | Li | ........................ | H04W 52/281 |
| 2018/0270698 A1* | 9/2018 | Babaei | .................. | H04W 72/21 |
| 2018/0359711 A1* | 12/2018 | Akkarakaran | ...... | H04W 52/362 |
| 2019/0159136 A1* | 5/2019 | MolavianJazi | ..... | H04W 52/362 |
| 2019/0215781 A1* | 7/2019 | Jeon | ..................... | H04W 52/325 |
| 2019/0268938 A1* | 8/2019 | Zhao | ..................... | H04W 48/16 |
| 2019/0289616 A1* | 9/2019 | Hampel | ................ | H04W 72/56 |
| 2019/0306801 A1* | 10/2019 | Zhou | ..................... | H04W 52/44 |
| 2020/0037260 A1* | 1/2020 | Fu | ........................ | H04W 52/146 |
| 2020/0059345 A1* | 2/2020 | Pelletier | ............... | H04L 5/0064 |
| 2020/0260474 A1* | 8/2020 | Shapin | .................. | H04L 47/245 |
| 2020/0359403 A1* | 11/2020 | Lee | ....................... | H04W 72/21 |

FOREIGN PATENT DOCUMENTS

| | | | | |
|---|---|---|---|---|
| WO | 2018/032001 A1 | 2/2018 | | |
| WO | WO-2018028076 A1 * | 2/2018 | .......... | H04L 1/0026 |
| WO | WO-2018032001 A1 * | 2/2018 | | |
| WO | 2018/130034 A1 | 7/2018 | | |

* cited by examiner

BASE STATION, USER EQUIPMENT, CIRCUITRY, MOBILE TELECOMMUNICATIONS SYSTEM AND METHOD FOR INTERRUPT PROCESSING OF LOWER PRIORITY DATA TRANSMISSION

CROSS-REFERENCE TO RELATED APPLICATIONS

The present application is based on PCT filing PCT/EP2019/069542, filed Jul. 19, 2019, which claims priority to EP 18185592.5, filed Jul. 25, 2018, the entire contents of each are incorporated herein by reference.

TECHNICAL FIELD

The present disclosure generally pertains to base stations, user equipment for a mobile telecommunications system, circuitries for user equipment and base station, mobile telecommunications system and method.

TECHNICAL BACKGROUND

Several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

A candidate for providing the requirements of 5G is the so-called Long Term Evolution ("LTE"), which is a wireless communications technology allowing high-speed data communications for mobile phones and data terminals and which is already used for 4G mobile telecommunications systems. Other candidates for meeting the 5G requirements are termed New Radio (NR) Access Technology Systems. An NR can be based on LTE technology, just as some aspect of LTE was based on previous generations of mobile communications technology.

The 3GPP Rel-15 New Radio (NR) Access Technology Work Item, whose objectives are defined in RP-172834, "Work Item on New Radio (NR) Access Technology," NTT DOCOMO, RAN #78, Lisbon, Portugal, Dec. 18-21, 2017, specifies the $5^{th}$ generation or 5G radio access network, and specifies two NR functionalities, namely:

Enhanced Mobile Broadband (eMBB), and
Ultra Reliable & Low Latency Communications (URLLC), wherein eMBB services are characterized by high capacity with a requirement to support up to 20 Gb/s. For efficient transmission of large amounts of data at high throughput, eMBB requires a long scheduling time so as to minimize the overhead used (where the "scheduling time" we refer to is the time to allocate and transmit a data packet). A known important requirement for URLLC is low latency measured from the ingress of a layer 2 packet to its egress from the network, with a proposed target of 1 ms. The URLLC data is expected to be short and hence a short scheduling time where the control and data have short duration are required within a frame duration that is significantly less than that of the eMBB frame.

Generally, it is known to pre-empt resources of an ongoing transmission, such as eMBB, such that pre-empted resources can be used for low latency transmission such as URLLC Although there exist techniques for transmission of data in pre-empted resources, it is generally desirable to improve the existing techniques.

SUMMARY

According to a first aspect, the disclosure provides a user equipment for a mobile telecommunications system comprising circuitry configured to communicate with at least one base station, wherein the circuitry is further configured to interrupt processing of a lower priority data transmission when a higher priority data transmission has to be processed, when it is determined that an available processing power is below a predetermined threshold.

According to a second aspect, the disclosure provides a base station for a mobile telecommunications system comprising circuitry configured to communicate with at least one user equipment, wherein the circuitry is further configured to determine, based on a processing power of the at least one user equipment for a lower priority data transmission scheduled for a first transmission slot, whether the at least one user equipment is able to transmit the lower priority data in the scheduled transmission slot; and decode a second transmission slot, based on the determination result and when it is determined that a higher priority data transmission is scheduled for the at least one user equipment.

According to a third aspect, the disclosure provides a base station for a mobile telecommunications system comprising circuitry configured to communicate with at least one user equipment, wherein the circuitry is further configured to determine, based on an indication received from the at least one user equipment, that a scheduled lower priority data transmission from the at least one user equipment failed, wherein processing of the lower priority data transmission is pre-empted by processing of a higher priority data transmission.

According to a fourth aspect, the disclosure provides a base station for a mobile telecommunications system comprising circuitry configured to communicate with at least one user equipment, wherein the circuitry is further configured to transmit a pre-emption indicator to the at least one user equipment for pre-empting a hybrid automatic repeat request process.

According to a fifth aspect, the disclosure provides a base station for a mobile telecommunications system comprising circuitry configured to communicate with at least one user equipment, wherein the circuitry is further configured to receive a pre-emption indicator from the at least one user equipment indicating that a hybrid automatic repeat request process has been pre-empted; and determining, based on the pre-emption indicator, to perform a re-transmission of lower priority data to the at least one user equipment.

According to a sixth aspect, the disclosure provides a circuitry for a user equipment for a mobile telecommunications system configured to communicate with at least one base station, wherein the circuitry is further configured to interrupt processing of a lower priority data transmission when a higher priority data transmission has to be processed, when it is determined that an available processing power is below a predetermined threshold.

According to a seventh aspect, the disclosure provides a circuitry for a base station for a mobile telecommunications system configured to communicate with at least one user equipment, wherein the circuitry is further configured to determine, based on a processing power of the at least one user equipment for a lower priority data transmission scheduled for a first transmission slot, whether the at least one user equipment is able to transmit the lower priority data in the scheduled transmission slot; and decode a second transmission slot, based on the determination result and when it is determined that a higher priority data transmission is scheduled for the at least one user equipment.

According to an eighth aspect, the disclosure provides a circuitry for a base station for a mobile telecommunications system configured to communicate with at least one user equipment, wherein the circuitry is further configured to determine, based on an indication received from the at least one user equipment, that a scheduled lower priority data transmission from the at least one user equipment failed, wherein processing of the lower priority data transmission is pre-empted by processing of a higher priority data transmission.

According to a ninth aspect, the disclosure provides a circuitry for a base station for a mobile telecommunications system configured to communicate with at least one user equipment, wherein the circuitry is further configured to transmit a pre-emption indicator to the at least one user equipment for pre-empting a hybrid automatic repeat request process.

According to a tenth aspect, the disclosure provides a circuitry for a base station for a mobile telecommunications system configured to communicate with at least one user equipment, wherein the circuitry is further configured to receive a pre-emption indicator from the at least one user equipment indicating that a hybrid automatic repeat request process has been pre-empted; and determine, based on the pre-emption indicator, to perform a re-transmission of lower priority data to the at least one user equipment.

According to an eleventh aspect, the disclosure provides a mobile telecommunications system method for providing communication between at least one base station and at least one user equipment, comprising interrupting processing of a lower priority data transmission when a higher priority data transmission has to be processed, when it is determined that an available processing power is below a predetermined threshold.

According to a twelfth aspect, the disclosure provides a mobile telecommunications system method for providing communication between at least one base station and at least one user equipment, comprising determining, based on a processing power of the at least one user equipment for a lower priority data transmission scheduled for a first transmission slot, whether the at least one user equipment is able to transmit the lower priority data in the scheduled transmission slot; and decoding a second transmission slot, based on the determination result and when it is determined that a higher priority data transmission is scheduled for the at least one user equipment.

According to a thirteenth aspect, the disclosure provides a mobile telecommunications system method for providing communication between at least one base station and at least one user equipment, comprising determining, based on an indication received from the at least one user equipment, that a scheduled lower priority data transmission from the at least one user equipment failed, wherein processing of the lower priority data transmission is pre-empted by processing of a higher priority data transmission According to a fourteenth aspect, the disclosure provides a mobile telecommunications system method for providing communication between at least one base station and at least one user equipment, comprising transmitting a pre-emption indicator to the at least one user equipment for pre-empting a hybrid automatic repeat request process.

According to a fifteenth aspect, the disclosure provides a mobile telecommunications system method for providing communication between at least one base station and at least one user equipment, comprising receiving a pre-emption indicator from the at least one user equipment indicating that a hybrid automatic repeat request process has been pre-empted; and determining, based on the pre-emption indicator, to perform a re-transmission of lower priority data to the at least one user equipment.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 5:
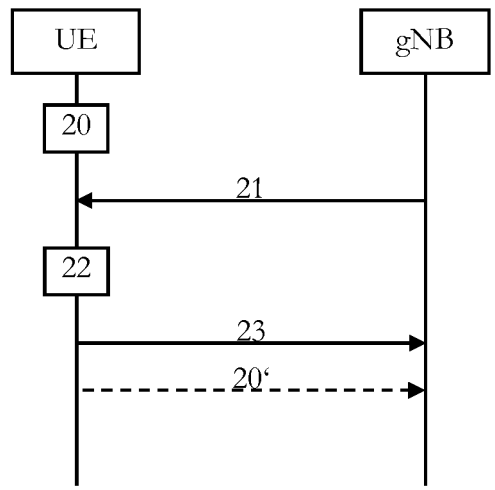
FIG. 5 illustrates an embodiment where processing of a lower priority data transmission is interrupted by a higher priority data transmission.

Before a detailed description of the embodiments under reference of FIG. 5 is given, general explanations are made.

As mentioned in the outset, in general, several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

One of the candidates for meeting the 5G requirements are termed New Radio (NR) Access Technology Systems. Some aspects of NR can be based on LTE technology, in some embodiments, just as some aspects of LTE were based on previous generations of mobile communications technology.

As mentioned in the outset, two new functionalities for the New Radio (NR) Access Technology, which are discussed, are Enhanced Mobile Broadband (eMBB) and Ultra Reliable & Low Latency Communications (URLLC) services.

Figure 1:
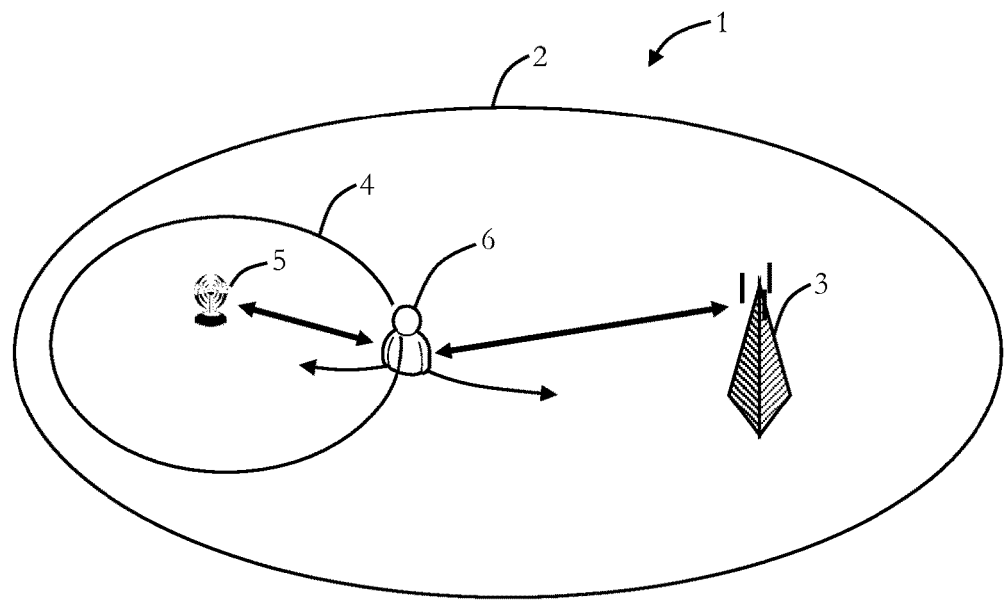
FIG. 1 illustrates an embodiment of a radio access network.

A typical embodiment of an NR radio network RAN 1 is illustrated in FIG. 1. The RAN 1 has a macro cell 2, which is established by an LTE eNodeB 3, and an NR cell 4, which is established by an NR eNodeB 5 (also referred to as gNB (next generation eNodeB)).

A UE 6 can communicate with the LTE eNodeB 3 and, as long as it is within the NR cell 4, it can also communicate with the NR eNodeB 5.

Figure 2:
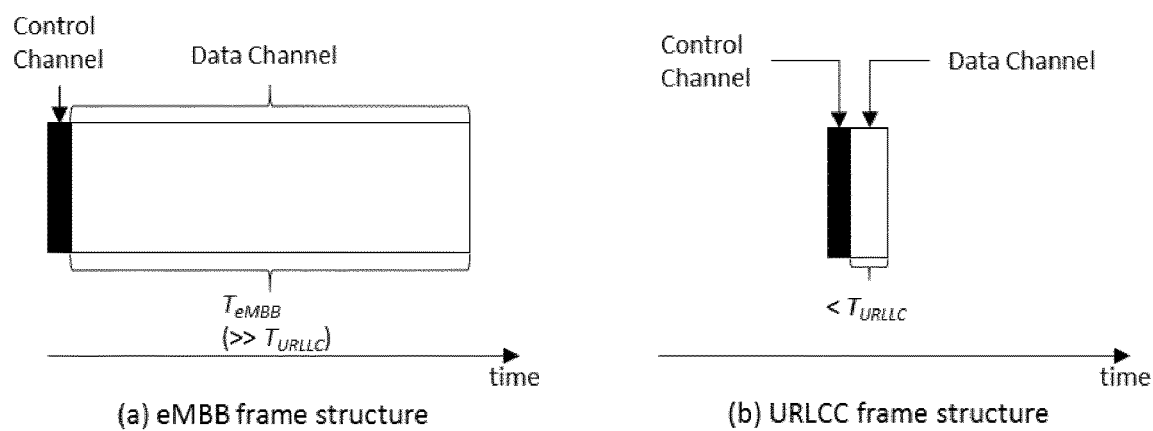
FIG. 2(a) illustrates an example of an eMBB frame structure.
FIG. 2(b) illustrates an example of a URLCC frame structure.

As mentioned, eMBB services are characterized in some embodiments by high capacity with a requirement to support up to 20 Gb/s. For efficient transmission of large amounts of data at high throughput, eMBB requires a long scheduling time so as to minimize the overhead used (wherein, in some embodiments, the "scheduling time" is the time to allocate and transmit a data packet). An example of an eMBB frame structure, which is used in some embodiments, is shown in FIG. 2(*a*) with a transmission period $T_{eMBB}$. In this example, the control channel uses significantly smaller transmission resources than that of the data channel.

In some embodiments, as mentioned, a requirement for URLLC is low latency measured from the ingress of a layer 2 packet to its egress from the network, with a proposed target of 1 ms, without limiting the present disclosure in that regard. The URLLC data may be expected to be short and hence a short scheduling time where the control and data have short duration are required in some embodiments within a frame duration that is significantly less than that of the eMBB frame. An example of a URLLC frame structure, which is used in some embodiments, is shown in 2(*b*) with a transmission period of $T_{URLLC}$ (e.g. 0.25 ms), where the control and data channels occupy a short duration of time. In this example, the transmission period of URLLC $T_{URLLC}$ is much smaller than that of eMBB $T_{eMBB}$, i.e. $T_{eMBB} \gg T_{URLLC}$.

Figure 3:
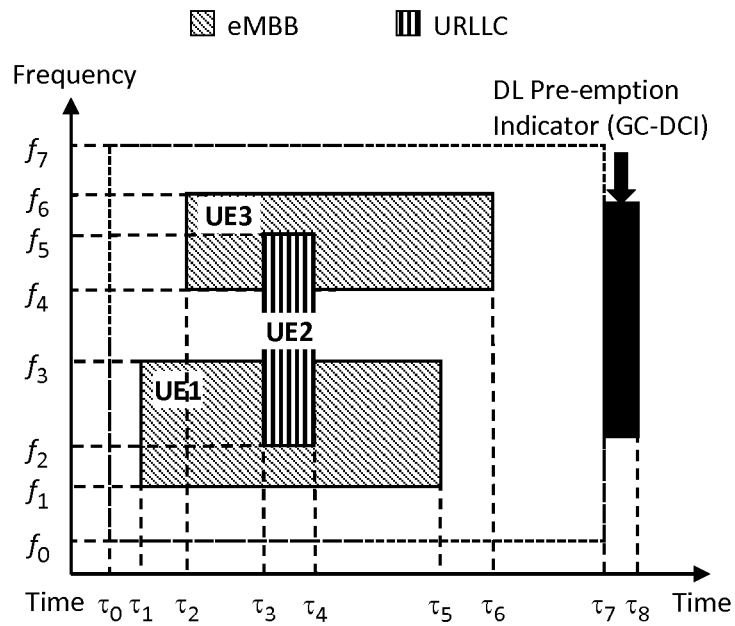
FIG. 3 illustrates transmission of a pre-emption indicator in a control channel.

One aspect in the operation of eMBB and URLLC in a cell or gNB is in some embodiments that the gNB is able to pre-empt the resources of an ongoing transmission e.g. eMBB, so that it can use these pre-empted resources to transmit the low latency transmission such as URLLC In some embodiments, a Pre-emption Indicator for downlink eMBB and URLLC multiplexing may be provided, wherein the Pre-emption Indicator is signalled in a control channel, i.e. DCI (downlink control information), after the eMBB transmission, as is illustrated in FIG. 3.

Here, an eMBB transmission is transmitted to a UE, e.g. UE1, between time $\tau_1$ and $\tau_5$ in the frequency range between $f_1$, to $f_3$. At a point of time $\tau_3$, the gNB (e.g. gNB 5 of FIG. 1) transmits a URLLC packet in the frequency range of $f_2$ to $f_5$ to another UE, e.g. UE2, where this URLLC transmission ends at time $\tau_4$. In other words, the URLLC transmission for UE2 pre-empts part of the resources that are originally scheduled for UE1's eMBB transmission. A downlink Pre-emption Indicator is transmitted by the gNB at time $\tau_7$ to indicate to UE1 that part of its resources have been pre-empted so that UE1 can take ameliorative steps in decoding the eMBB message, e.g. UE1 can zero out the soft bits corresponding to the pre-empted parts.

In Rel-15 NR, the downlink (DL) Pre-emption Indicator is transmitted using a Group Common DCI (or GC-DCI, known as DCI Format 2_1 in 3GPP, see, for example, 3GPP TS 38.212, "Multiplexing and channel coding (Release 15)", V1.1.0, 2017-10), where a GC-DCI contains control information for a group of UEs.

The rationale behind using GC-DCI in some embodiments is that the URLLC in the downlink is expected to occupy a wide frequency bandwidth (but a narrow period of time) and so it is likely that the URLLC will pre-empt more than one eMBB UE.

For example in FIG. 3, the URLLC transmitted to UE2 occupies frequency resources from $f_2$ to $f_5$, which would pre-empt resources originally scheduled for UE1 and UE3. Instead of transmitting multiple Pre-emption Indicators, it is deemed more efficient to transmit a single Pre-emption Indicator to a group of UEs. This Pre-emption Indicator just needs to indicate the resources occupied by the URLLC packet, e.g. occupying time $\tau_3$ to $\tau_4$ and frequency $f_2$ to $f_5$. The UEs receiving this Pre-emption Indicator will determine which resources indicated by the Pre-emption Indicator overlap with their most recent eMBB transmission. For instance, in FIG. 3 UE1 will determine that the resources between time $\tau_3$ and $\tau_4$ and frequency $f_2$ and $f_3$ are pre-empted, whilst UE3 will determine that the resources between time $\tau_3$ and $\tau_4$ and frequency $f_4$ and $f_5$ are pre-empted.

The GC-DCI carrying the Downlink Pre-emption Indicator addresses a Reference Downlink Region (RDR) in some embodiments. For example, in FIG. 3 an RDR is defined between time $\tau_0$ and $\tau_7$ and between frequency $f_0$ to $f_7$. The Pre-emption Indicator carried by the GC-DCI may only indicate pre-empted resources if those pre-empted resources fall within this RDR. An eMBB UE with a transmission that falls within the RDR will read in some embodiments the Pre-emption Indicator in the corresponding GC-DCI to determine where (if any), the pre-empted resources are. The RDR may occur periodically in time, i.e. a GC-DCI is transmitted periodically, and occupies a fixed frequency region. In the above-mentioned Rel-15 NR, the frequency region occupied by the RDR is equivalent to the Bandwidth Part (BWP) of the UEs configured to monitor the GC-DCI corresponding to that RDR. In some embodiments, the BWP is a fraction of the system bandwidth configured by the network for a UE to operate in and the rationale is that a UE operating in a narrow bandwidth would consume less power than one operating over the whole (and much wider) system bandwidth.

For uplink transmission, the resources used by the UE can be grant based or grant free in some embodiments:

In some embodiments, grant based resources are resources dynamically scheduled by the gNB using an explicit uplink grant in a DCI.

In some embodiments, grant free resources are resources semi-statically configured by the gNB for a group of UEs. These UEs can then use these uplink grant free resources anytime they want (once they are activated to do so) without any explicit uplink grant.

Figure 4:
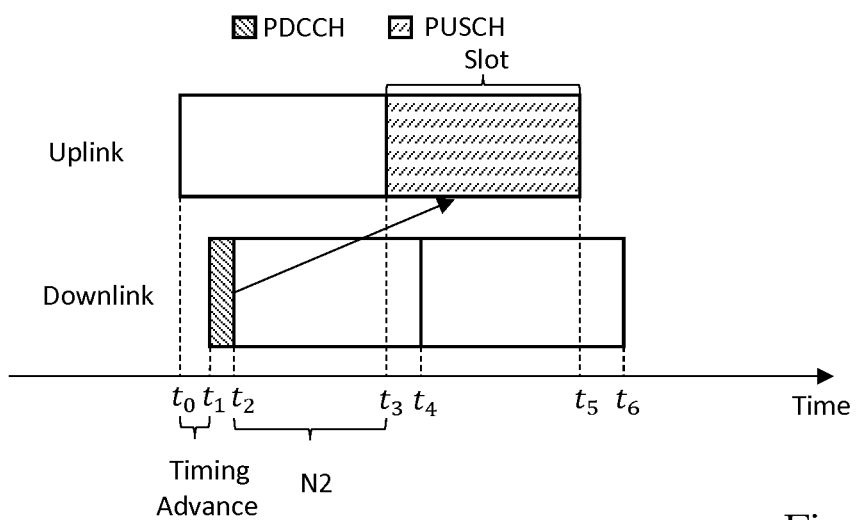
FIG. 4 illustrates a processing time interval.

After the UE receives a PDCCH (Physical Downlink Control Channel) and processes the DCI carrying an uplink grant, the UE needs to process this grant (i.e. parse the contents of the uplink grant) and prepare for the PUSCH (Physical Uplink Shared Channel) transmission. The processing time expected of a Rel-15 NR UE is termed as N2 as shown in FIG. 4, which is 10 symbols for a 15 kHz subcarrier spacing. As can be taken from FIG. 4, a PDCCH is transmitted in the time interval from $t_1$ to $t_2$ and a PUSCH is transmitted in the time interval starting at $t_3$ until $t_5$, and the time interval between the PDCCH and the PUSCH is termed N2.

In some embodiments at least some of the following scenarios are implemented, in particular for pre-emption of uplink eMBB transmissions:

Intra-UE Pre-emption, where the URLLC packet is transmitted using grant based resources. In this scenario, the UE firstly receives an uplink grant for eMBB transmission and then later receives another uplink grant for a URLLC transmission, wherein this URLLC transmission occupies some of the eMBB resources.

Intra-UE Pre-emption, where the URLLC packet is transmitted using uplink grant free resources. In this scenario, the UE firstly receives an uplink grant for an eMBB transmission and during the eMBB transmission, the UE decides to use the uplink grant free resource for URLLC transmission.

Inter-UE Pre-emption, where the URLLC is transmitted using grant based resources. In this scenario, a first UE receives an uplink grant for eMBB transmission. The gNB then transmits another uplink grant to schedule a second UE for URLLC transmission, wherein the URLLC transmission occupies some of the resources reserved/allocated for the eMBB transmission of the first UE.

Inter-UE Pre-emption, where the URLLC is transmitted using grant free resources. In this scenario, a first UE receives an uplink grant for eMBB transmission, wherein some or all of this transmission occupies some uplink grant free resources. A second UE decides to transmit a URLLC packet using uplink grant free resources, wherein some of the resources used by its URLLC transmission collides with those of the eMBB transmission of the first UE. Here, in some embodiments, only the grant free resources occupied by the eMBB UE collide with the URLLC transmission (i.e. the resources that are assigned to the eMBB UE that are not grant free resources, but instead are grant-based resources, do not collide with the URLLC transmission).

Hence, it has been recognized that intra-UE pre-emption may be improved in some embodiments.

Thus, some embodiments pertain to (a circuitry for) a user equipment for a mobile telecommunications system including circuitry configured to communicate with at least one base station, wherein the circuitry is further configured to interrupt processing of a lower priority data transmission when a higher priority data transmission has to be processed, when it is determined that an available processing power is below a predetermined threshold.

In this specification, an eMBB transmission is an example of a "lower priority data transmission" (or a "long data transmission") and a URLLC transmission is an example for a "higher priority data transmission (or "short data transmission"). The lower priority data transmission and the higher priority data transmission may be an uplink or a downlink transmission.

The base station may be based on the principles of LTE (LTE-A) and/or it may be based on NR RAT, as also discussed above. The base station may be based on the known eNodeB of LTE, as one example, or it may be based on the discussed NR gNodeB. The user equipment may be, for example, a mobile phone, smartphone, a computer, tablet, tablet personal computer, or the like, including a mobile communication interface, or any other device which is able to perform a mobile telecommunication via, for example, LTE or NR, such as a hot spot device with a mobile communication interface, etc.

The processing power of the user equipment (or the circuitry of the user equipment) may be based on a number of processes of transmission that can be handled in parallel, it may be based on the N2 interval as discussed above, etc. Moreover, the processing power of the user equipment (or the circuitry of the user equipment) may be indicated based on a number of processes of transmission that can be handled in parallel, it may be based on the N2 interval as discussed above, etc.

The processing of the lower priority data transmission and/or of the higher priority data transmission may involve also the processing of information regarding the preparation of the transmission of such data, including, for example, processing of scheduling information for scheduling the lower priority data transmission and/or the higher priority data transmission. Hence, in some embodiments, for example, the user equipment is in the preparation of the transmission of the lower priority data when it receives information about a higher priority data transmission, and, thus, interrupts the processing (preparation) of the lower priority data transmission, and may start with preparation and consecutive transmission of the higher priority data transmission.

In some embodiments, the transmission of the lower priority data transmission is interrupted, when the processing is interrupted.

In some embodiments, the transmission of the lower priority data transmission is terminated and, for example, resumed at a later point of time or never resumed.

In some embodiments, the transmission of the lower priority data transmission is postponed, e.g. to a specific point of time (time slot, or the like).

In some embodiments, resources for the postponed transmission of the lower priority data are scheduled by the at least one base station, e.g. the resources are scheduled based on at least one of: downlink control information, pre-emption indicator. The downlink control information may be associated with a short data transmission or a long data transmission.

The postponed lower priority data transmission may also be transmitted in an uplink grant free resource.

In some embodiments, the circuitry is further configured to transmit a pre-emption indicator to the base station. The pre-emption indicator may be transmitted when it is determined that the transmission of the lower priority data has failed in a scheduled resource due to processing of the higher priority data. The pre-emption indicator may indicate for a multiple input multiple output transmission which stream of the multiple input multiple output transmission has been pre-empted by the higher priority data transmission In some embodiments, when processing of lower priority data of multiple input multiple output transmission is interrupted, a stream of the multiple input multiple output transmission having the smallest transport block size is interrupted.

In some embodiments, the circuitry is further configured to transmit a pre-emption indicator in a physical uplink control channel. The pre-emption indicator may be transmitted when it is determined that a physical downlink shared channel has been pre-empted by the high priority data transmission. The pre-emption indicator may also be transmitted when it is determined that the time interval for processing of the physical downlink shared channel is larger than the time interval between the physical downlink shared channel and its corresponding hybrid automatic repeat request (HARQ) feedback (e.g. larger than the time interval between the end of the physical downlink shared channel and the start of the transmission of a physical uplink control channel carrying the HARQ feedback), wherein the pre-emption indicator may be transmitted instead of a NACK feedback.

In some embodiments, the circuitry is further configured to delay a hybrid automatic repeat request feedback for a physical downlink shared channel. The hybrid automatic repeat request feedback may be delayed when it is determined that a time interval for processing of the physical downlink shared channel carrying the low priority data transmission is larger than a time interval between the physical downlink shared channel and its corresponding hybrid automatic repeat request feedback transmitted in a scheduled physical uplink control channel.

Some embodiments pertain to (a circuitry for) a base station for a mobile telecommunications system including circuitry configured to communicate with at least one user equipment, wherein the circuitry is further configured to determine, based on a processing power of the at least one user equipment for a lower priority data transmission scheduled for a first transmission slot, whether the at least one user equipment is able to transmit the lower priority data in the scheduled transmission slot; and decode a second transmission slot, based on the determination result and when it is determined that a higher priority data transmission is scheduled for the at least one user equipment. Thereby, it may be avoided that an empty slot is decoded, noise data is buffered, that a slot is misinterpreted as having a bad quality, etc. In some embodiments, the second transmission slot is after the first transmission slot, while in other embodiments, the second transmission slot is before the first transmission slot, although it might be scheduled later than the first transmission slot.

Some embodiments pertain to (a circuitry for) a base station for a mobile telecommunications system including circuitry configured to communicate with at least one user equipment, wherein the circuitry is further configured to determine, based on an indication received from the at least one user equipment, that a scheduled lower priority data transmission from the at least one user equipment failed, wherein the processing of the lower priority data transmission is pre-empted by the processing of a higher priority data transmission.

The indication may be at least one of: NACK and a (processing) pre-emption indicator.

In some embodiments, the indication is received by the base station in a higher priority data transmission or in a physical uplink control channel, wherein the physical uplink control channel may be associated with resources for the lower priority data transmission.

The indication may be received by the base station in a scheduled physical uplink control channel, wherein the indication may be piggy-backed, for example, on a hybrid automatic repeat request ACK for a physical downlink shared channel and/or a scheduling request.

In some embodiments, the base station circuitry is further configured to not decode the lower priority data transmission based on the determination that the scheduled lower priority data transmission from the at least one user equipment failed. Hence, if, for example, the UE informs the base station that the lower priority data transmission (e.g. eMBB transmission) has been cancelled, the base station does not decode the lower priority data transmission resources.

Some embodiments pertain to (a circuitry for) a base station for a mobile telecommunications system including circuitry configured to communicate with at least one user equipment, wherein the circuitry is further configured to transmit a pre-emption indicator to the at least one user equipment for pre-empting a hybrid automatic repeat request process, wherein the pre-emption indicator may be a hybrid automatic repeat request process pre-emption indicator.

The base station circuitry may be further configured to resume the pre-empted hybrid automatic repeat request process, by transmitting a resume hybrid automatic repeat request process indicator to the at least one user equipment.

Some embodiments pertain to (a circuitry for) a base station for a mobile telecommunications system including circuitry configured to communicate with at least one user equipment, wherein the circuitry is further configured to receive a pre-emption indicator from the at least one user equipment indicating that a hybrid automatic repeat request process has been pre-empted; and determine, based on the pre-emption indicator, to perform a re-transmission of lower priority data to the at least one user equipment.

The features discussed in connection with the base station and/or user equipment can also be realized as a mobile telecommunications system method.

Returning to the detailed description of embodiments, FIG. 5 illustrates an embodiment of the present disclosure, where a UE, such as UE 6 of FIG. 1, interrupts the processing of lower priority data (e.g. a lower priority message) when higher priority data (e.g. a higher priority message) are to be processed, wherein the interruption may be performed by delaying or dropping the processing of the lower priority data, without limiting the present disclosure to these two examples.

As illustrated in FIG. 5, at 20, the UE performs a $1^{st}$ transmission packet processing of lower priority data (e.g. eMBB transmission) for a transmission which is to be performed in the future, e.g. in a physical uplink shared channel PUSCH, wherein this future transmission is indicated at 20'. At 21, the transmission at 20' is pre-empted, e.g. by receiving information about a $2^{nd}$ transmission having a higher priority than the $1^{st}$ transmission and wherein the processing of the $2^{nd}$ transmission needs to commence prior to 20', i.e. during the time period in which the processing of the $1^{st}$ transmission should be performed.

At 22, the UE performs a $2^{nd}$ transmission packet processing and the UE stops the $1^{st}$ transmission packet processing and processes the $2^{nd}$ transmission packet processing, if the $2^{nd}$ transmission packet (higher priority data) has a higher priority than the $1^{st}$ transmission packet (lower priority data), as is exemplary assumed in the present embodiment, and after having determined that there is not sufficient processing power available to process both the transmissions for the $1^{st}$ transmission packet and the $2^{nd}$ transmission packet. Hence, the UE transmits the $2^{nd}$ transmission packet(s) at 23, which is, in this embodiment, before the planned transmission at 20' of the $1^{st}$ transmission data. As the processing of the $1^{st}$ transmission was interrupted, the planned transmission at 20' is skipped.

In the following, further embodiments of the method as described under reference of FIG. 5 are discussed.

Figure 6:
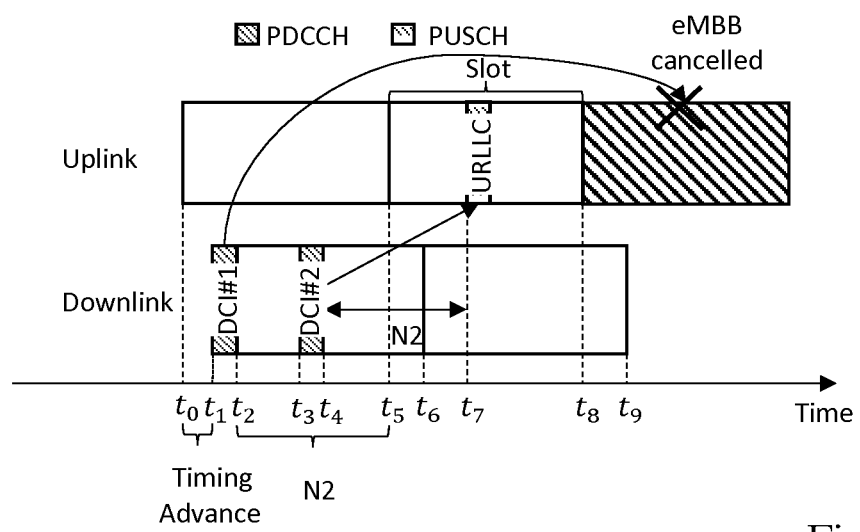
FIG. 6 illustrates the embodiment of FIG. 5 by showing an uplink and a downlink.

In an embodiment, the said transmission packet/data is a PUSCH channel carrying user data, as also illustrated in FIG. 6, which shows the uplink in an upper section and the downlink in a lower section and the time t on the abscissa. Generally, in this embodiment, during the processing time N2 of a $1^{st}$ transmission packet (e.g. eMBB), a $2^{nd}$ higher priority packet (e.g. URLLC) arrives which pre-empts the processing of the eMBB processing. In this embodiment, if there is not sufficient time to process the $1^{st}$ packet for transmission after processing the $2^{nd}$ packet, the UE drops the $1^{st}$ packet. Even though the URLLC packet may not pre-empt the resources of the eMBB packet, the eMBB packet is dropped because it could not be processed in time for the transmission in the scheduled slot. For further illustration, an example is shown in FIG. 6. At a time $t_1$, a first downlink control information DCI #1 is transmitted from a gNB (such as gNB 5 of FIG. 1) in the downlink to the UE (such as UE 6 in FIG. 1) carrying an uplink grant to schedule a PUSCH for an eMBB transmission at a time $t_8$ (2 slots later). While the UE processes the PUSCH for eMBB transmission, the gNB transmits a DCI #2 at time $t_3$ to the same UE with an uplink grant for a URLLC PUSCH transmission at time $t_7$. Since the URLLC packet has a higher priority than the eMBB packet, and assuming there is not sufficient processing power, the UE has to stop the eMBB packet processing and starts the URLLC packet processing. In this example the UE drops the eMBB packet. However, it should be noted that, if the eMBB transmission occurs later (e.g. 3 slots later), the UE may be able to process this packet after it processes the URLLC packet and hence is able to transmit it.

Figure 7:
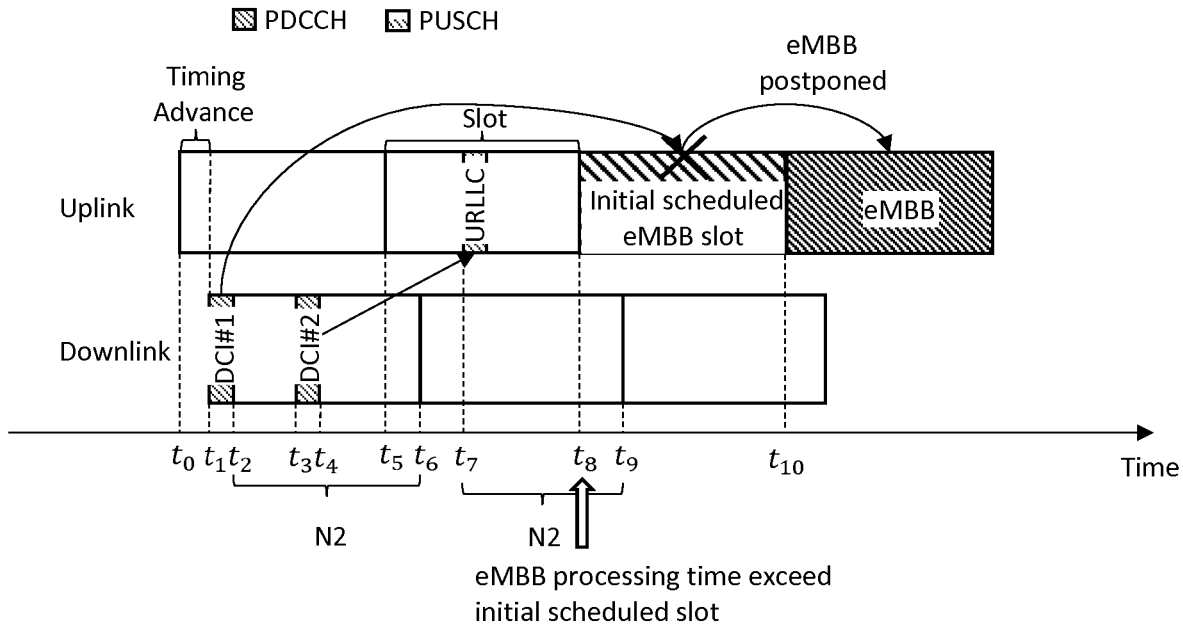
FIG. 7 illustrates an embodiment where an interrupted lower priority data transmission is transmitted in another slot.

In another embodiment, which is also illustrated in FIG. 7., when the $2^{nd}$ packet is scheduled to be transmitted while the UE is processing the $1^{st}$ packet, where the $2^{nd}$ packet has a higher priority than the $1^{st}$ packet, the UE delays the processing of the $1^{st}$ packet and if it cannot process the $1^{st}$ packet in time for the scheduled transmission slot, it will transmit the packet in another slot. For further illustration, an example is shown in FIG. 7, which illustrates an uplink in an upper section and the downlink at a lower section. At a time $t_1$ a DCI #1 is transmitted to the UE which schedules an eMBB PUSCH transmission at time $t_8$ (2 slots later). While the UE processes the eMBB transmission, a DCI #2 arrives at time $t_3$, which schedules a URLLC PUSCH transmission at time $t_7$, i.e. before the eMBB PUSCH transmission. The URLLC processing pre-empts the eMBB processing. Thus, in this embodiment, due to the detected pre-emption of the eMBB processing, the UE delays the eMBB processing until after the URLLC processing, i.e. the eMBB processing is delayed and restarts after time $t_7$ where the URLLC transmission starts. However, the processing time for the eMBB transmission causes the UE to miss its initially scheduled slot at time $t_8$ for the eMBB transmission, such that the UE postpones the eMBB transmission to the next slot at time $t_{10}$.

In another embodiment, which is also explained under reference of FIG. 7, when a $1^{st}$ transmission packet processing is pre-empted by a $2^{nd}$ transmission packet processing, the $1^{st}$ packet is postponed to a predetermined slot. This predetermined slot can be indicated, for example as an offset to the initial scheduled slot/time in, e.g.:

The DCI that schedules the $1^{st}$ packet: For instance, the DCI indicates two starting times for the first transmission: i) Starting time assuming no processing pre-emption, ii) starting time assuming processing pre-emption. The UE then transmits the first transmission at a time depending on whether there has been pre-emption or not.

The DCI that schedules the $2^{nd}$ packet (the pre-emptor).

Indicated in a Pre-emption Indicator

RRC configured

Referring to the example illustrated in FIG. 7, here an offset of 1 slot is indicated in DCI #2 and, thus, the UE postpones the eMBB transmission by 1 slot. The gNB blind decodes both the initial scheduled slot and the postponed slot.

Figure 8:
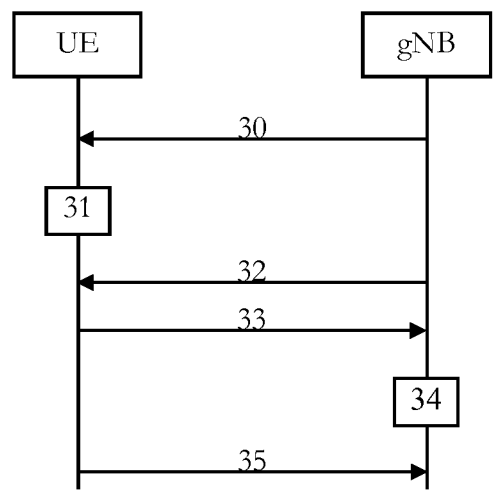
FIG. 8 illustrates an embodiment where a base station takes the processing capability of a user equipment into account.

However, in some embodiments, the gNB is aware of the UE's processing capability, such that it then can determine whether the UE is able to transmit the eMBB data in the initially scheduled slot (e.g. if the UE has a capability such that it can process the PUSCH in a processing time<N2) or is postponed to another slot. This is illustrated in FIG. 8. At 30, the gNB sends DCI #1 (see also FIG. 7, time $t_1$) to the UE for scheduling an eMBB PUSCH transmission at time $t_8$ (2 slots later), and at 31, the UE starts processing of the eMBB transmission (lower priority data). At 32, the gNB transmits DCI #2 to the UE which arrives at time $t_3$ in FIG. 7 and which schedules a URLLC PUSCH transmission at time $t_7$ in FIG. 7. The UE interrupts processing of the eMBB transmission, as discussed, and transmits at 33 (time $t_7$ in FIG. 7) the URLLC transmission to the gNB. At 34, the gNB determines, based on the processing capacity which is known to the gNB, that the UE will not be able to transmit the eMBB transmission in the initially scheduled time slot at is and, thus, listens to and decodes the time slot starting at $t_{11}$ at 35 at which the UE transmits the postponed (1 slot in this example) eMBB transmission.

In another embodiment, when a $1^{st}$ transmission packet processing is pre-empted by a $2^{nd}$ transmission packet processing, as discussed above, the $1^{st}$ packet is postponed and transmitted in an uplink grant free resource (e.g. referring to FIG. 7, this means that the postponed eMBB transmission is not made in the granted PUSCH, but in an uplink grant free resource (e.g. uplink grant free PUSCH)).

In another embodiment, the UE signals its processing capability to the gNB, e.g. in the RRC Connection Setup Complete message. Thereby, the gNB knows, for example, whether and how many parallel transmissions the UE can process. For instance, if the UE can process two transmissions in parallel, then the gNB knows that when the UE is processing the $1^{st}$ transmission packet, an arrival of a $2^{nd}$ transmission packet would not disrupt the processing of the $1^{st}$ transmission packet. The processing capability may also inform the gNB about the speed of the UE's processor which allows the gNB to determine whether the UE needs to postpone or drop the $1^{st}$ packet if the transmission processing of the $1^{st}$ packet is pre-empted by a $2^{nd}$ transmission packet processing, as was discussed also under reference of FIG. 7.

In another embodiment, when the processing of the $1^{st}$ packet transmission is pre-empted by the $2^{nd}$ packet, as discussed above, the UE sends a "NACK due to processing" or a pre-emption indicator, i.e. a Processing Pre-emption Indicator (PPI) to the network. This Processing Pre-emption Indicator can be sent:

With the URLLC transmission, i.e. the $2^{nd}$ packet.

In a PUCCH using some of the resources for the eMBB. In an embodiment, the network can blind decode for the said resources being either PUCCH or eMBB PUSCH Piggy backed onto a scheduled PUCCH, e.g. a HARQ-ACK for a PDSCH or a Scheduling Request.

Figure 9:
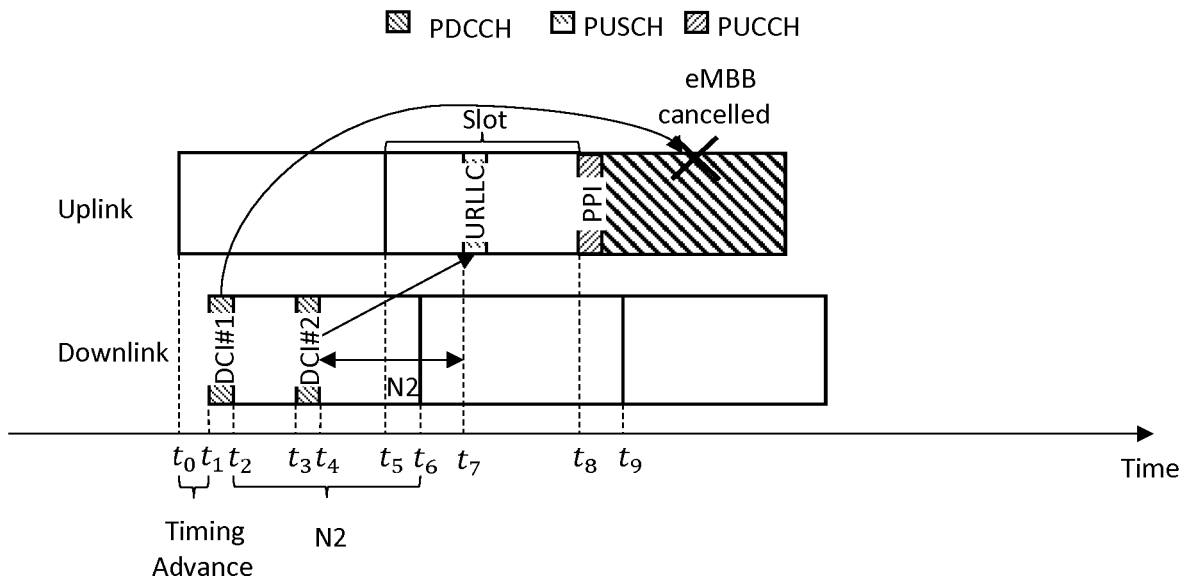
FIG. 9 illustrates an embodiment where a Processing Pre-emption Indicator is transmitted to the base station.

This Processing Pre-emption Indicator informs the gNB that nothing has been transmitted on the scheduled uplink resources, such that the gNB can take that into account in its decoding process, (e.g. by not adding anything from this transmission into its soft buffer, since the gNB would just be adding noise samples into its soft buffer) and also knows that the failed PUSCH transmission is not due to radio conditions (hence the gNB is able to determine that it should not erroneously update its link adaptation algorithm). For further illustrating this embodiment, an example is shown in FIG. 9, where an uplink is illustrated in an upper section and a downlink is illustrated in lower section. At a time $t_1$, a DCI #1 with an UL grant is transmitted to the UE for an eMBB PUSCH transmission at time $t_8$. While the UE processes the eMBB PUSCH transmission, the network transmits a DCI #2 at time $t_3$ to the same UE for a URLLC PUSCH transmission at time $t_7$. Assuming the UE does not have sufficient processing power to process both PUSCH transmissions (eMBB & URLLC) in parallel, as discussed above, the UE drops the eMBB PUSCH processing, in order to process the URLLC PUSCH. At time $t_8$, instead of transmitting the eMBB PUSCH, the UE transmits a Processing Pre-emption Indicator to inform the gNB that it had cancelled the eMBB transmission. The gNB would then not add or decode these resources to its soft buffer and not change its link adaptation incorrectly, since the failed transmission is not due to radio conditions.

In another embodiment, when an eMBB packet is transmitted with uplink MIMO (multiple input multiple output), the Processing Pre-emption Indicator, which has been discussed above, signals which MIMO stream's transmission has been cancelled. In MIMO transmission the UE will process more than one Transport Block (TB). The arrival of a URLLC packet may lead to the UE not being able to process both the several TBs for MIMO and the URLLC packet and instead of dropping the entire eMBB transmission, only one (or more) of the eMBB TBs in the MIMO transmission are dropped, in order to process the URLLC PUSCH transmission (assuming the URLLC is transmitted without MIMO or using MIMO with a lower order than that for the eMBB transmission).

In another embodiment, when an eMBB packet is transmitted with uplink MIMO and the processing is pre-empted by processing of a URLLC packet, the UE will cancel the MIMO stream with the smallest Transport Bock Size (TBS) or the smallest Eigen value. Dropping the MIMO stream with the smallest TBS would minimize the impact on the eMBB throughput.

Figure 10:
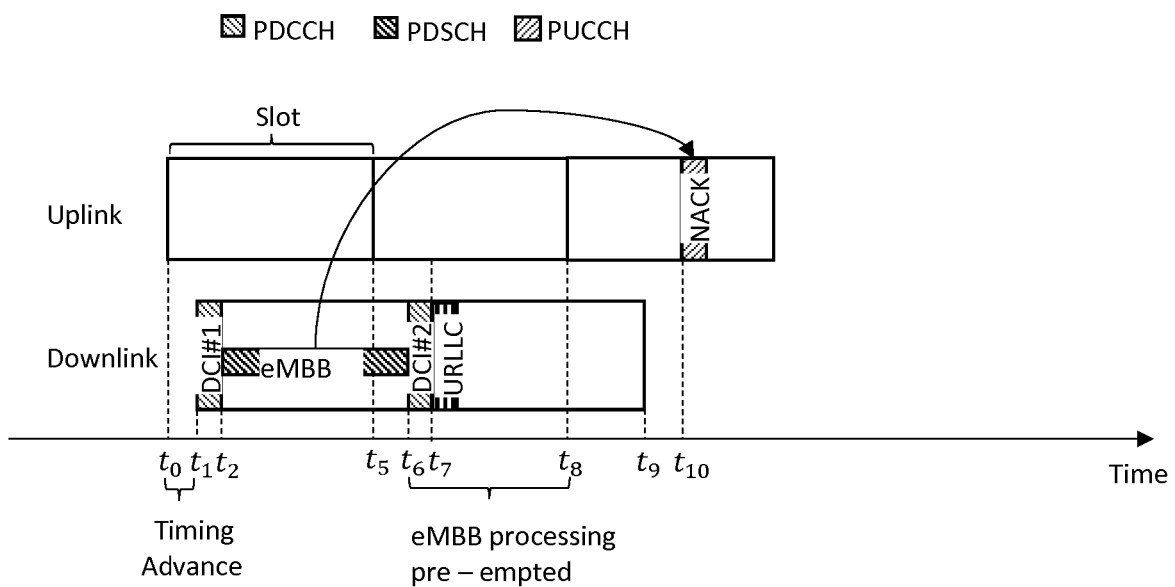
FIG. 10 illustrates an embodiment pertaining to downlink transmissions.

Some of the previously discussed embodiments referred to a transmission in the uplink. However, in some embodiments, the processing pre-emption also occurs in the downlink. In some embodiments, after a UE has received a $1^{st}$ downlink transmission (e.g. eMBB PDSCH) and while processing it, it receives a $2^{nd}$ downlink transmission (e.g. URLLC PDSCH) that has a higher priority than the $1^{st}$ downlink transmission. The UE would therefore process the $2^{nd}$ downlink transmission and either postpone or cancel the processing of the $1^{st}$ downlink transmission, as it has already been described for the embodiments pertaining to the uplink. If the UE cannot process the $1^{st}$ downlink transmission in time for it to transmit a HARQ-ACK feedback on a scheduled PUCCH, it drops the $1^{st}$ downlink transmission (i.e. eMBB PDSCH). For further illustration of this embodiment, an example is shown in FIG. 10, where an uplink is illustrated in an upper section and a downlink is illustrated in a lower section. At a time $t_1$ a DCI #1 is transmitted from the gNB to the UE, carrying a DL grant for an eMBB PDSCH transmission at time $t_2$. After having received the eMBB (i.e. storing ADC (analogue to digital conversion) samples of the eMBB transmission and performing some initial physical processing of those samples, e.g. performing channel estimation) at time t6, the UE further processes the eMBB PDSCH (e.g. generates LLRs (Log-Likelihood Ratio) and performs some iterations of an LDPC (Low Density Parity Check Code) decoding process) but further receives DCI #2 carrying a DL grant for a URLLC PDSCH transmission at time $t_7$. After processing of the URLLC packet, the UE runs out of time to complete processing of the eMBB PDSCH in time for the HARQ feedback at time $t_{10}$ and hence the UE drops the eMBB PDSCH packet and sends a NACK.

In the following, embodiments are discussed, where the UE transmits another indication than NACK for this processing pre-emption case.

Figure 11:
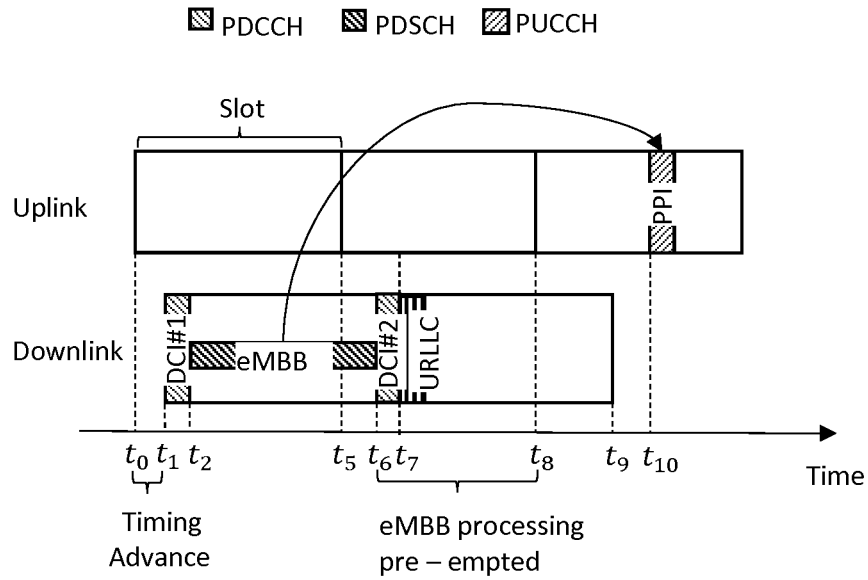
FIG. 11 illustrates an embodiment where a Processing Pre-emption Indicator is transmitted to the base station.

In another embodiment, when a $1^{st}$ downlink transmission processing (e.g. eMBB PDSCH) is pre-empted by the reception and processing of a $2^{nd}$ downlink transmission (e.g. URLLC PDSCH) and the UE is unable to process the $1^{st}$ downlink transmission in time to transmit a HARQ feedback in a scheduled PUCCH, the UE feedbacks a Processing Pre-emption Indicator to the network. Thereby, the network (e.g. gNB) knows that the failed eMBB PDSCH transmission is due to lack of processing power rather than due to radio conditions and therefore adjusts its link adaptation accordingly (i.e. the gNB does not subsequently use a lower MCS (Modulation and Coding Scheme)). For further illustrating this embodiment, an example is shown in FIG. 11 which is based on the same scenario as that of FIG. 10, where the PDSCH eMBB processing is pre-empted by a URLLC processing leading to the UE being not able to process the eMBB in time to give a HARQ feedback at time $t_{10}$, but instead of sending a NACK, the UE sends a Processing Pre-emption Indicator to inform the gNB that the failure is due to processing rather than radio conditions.

Figure 12:
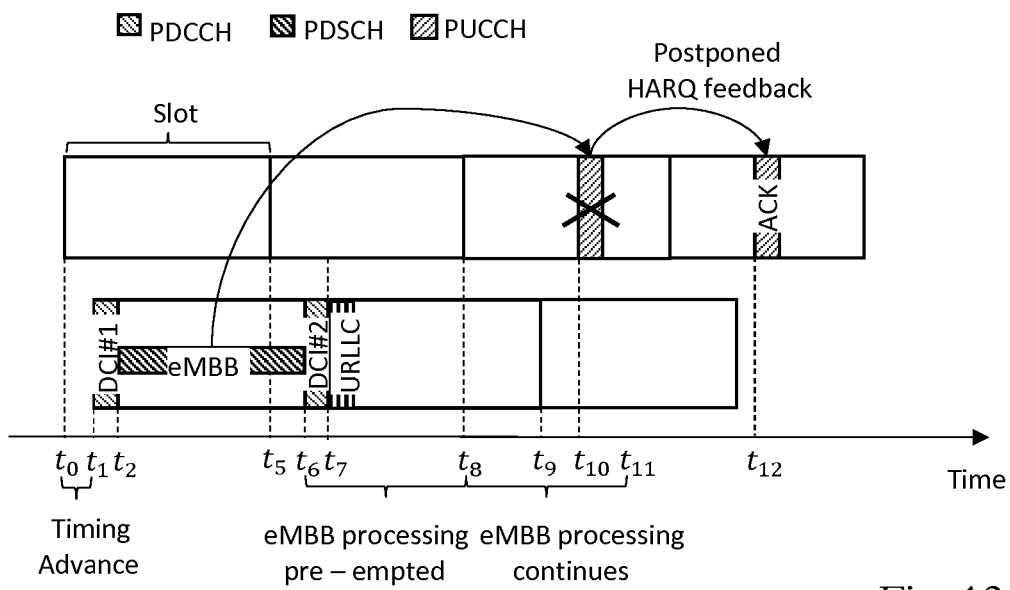
FIG. 12 illustrates an embodiment where a HARQ feedback is transmitted to the base station.

In another embodiment, when a $1^{st}$ downlink transmission processing (e.g. eMBB PDSCH) is pre-empted by the reception and processing of a $2^{nd}$ downlink transmission (e.g. URLLC PDSCH) and the UE is unable to process the $1^{st}$ downlink transmission in time to transmit a HARQ feedback in a scheduled PUCCH, the UE postpones the HARQ feedback. That is the UE would proceed to process the $1^{st}$ downlink transmission (e.g. eMBB PDSCH), but transmits the HARQ feedback at a later pre-determined time/resource. This pre-determined time/resource can be a PUCCH, which is scheduled by the DCI scheduling the $1^{st}$ downlink transmission, the DCI scheduling the $2^{nd}$ downlink transmission, in a Pre-emption Indicator or it can be RRC configured. For further illustrating this embodiment, an example is shown in FIG. 12, which is based on the scenario of FIG. 10, where the UE does not have sufficient time to process the eMBB PDSCH scheduled by DCI #1 in time for the HARQ feedback at the scheduled PUCCH at time $t_{10}$ due to the arrival of the URLLC PDSCH. Here, instead of sending a NACK (or PPI as in FIG. 11) using the scheduled PUCCH at time $t_{10}$, the UE continues the processing of the eMBB PDSCH until time and transmits a HARQ feedback, i.e. an ACK in this example, at a later time at time $t_{12}$.

Figure 13:
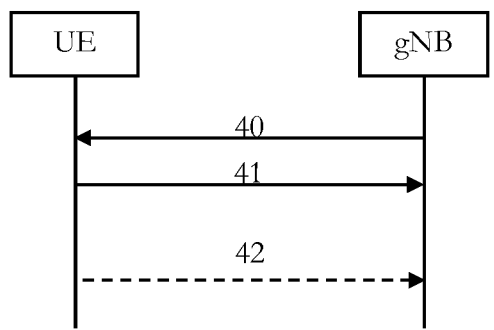
FIG. 13 illustrates an embodiment where the base station transmits a HARQ Process Pre-emption Indicator to the user equipment.

In another embodiment, there is a fixed or predefined number of HARQ processes available at the UE, wherein these HARQ processes and the associated soft buffer memory(ies) can be shared between an eMBB and an URLLC transmission. In this embodiment, the HARQ process of an eMBB PDSCH transmission can be pre-empted by that of a URLLC PDSCH transmission. That is in the case, where the UE has used up all the HARQ processes for eMBB transmissions and the UE is still undergoing retransmission of all its eMBB PDSCH transmissions, the gNB can instruct the UE to pre-empt an existing HARQ process (e.g. the gNB instructs the UE to pre-empt an existing eMBB-related HARQ process, in order to transmit URLLC data to that HARQ process). That is instead of sending a New Data Indicator for the URLLC transmission, which would lead to the UE discarding the entire soft buffer contents for that HARQ process for the eMBB PDSCH, the UE would instead manage its soft buffer to accommodate the URLLC transmission, after which the UE can resume the re-transmission of the pre-empted eMBB PDSCH. As also illustrated in FIG. 13, the network, i.e. the gNB in this embodiment, sends a HARQ Process Pre-emption Indicator (HPPI) at 40 to the UE to indicate that the HARQ process for a $1^{st}$ downlink transmission (e.g. eMBB PDSCH) has been pre-empted by a $2^{nd}$ downlink transmission (e.g. URLLC PDSCH), wherein the $2^{nd}$ downlink transmission is of higher priority than that of the $1^{st}$ downlink transmission. The UE then uses the pre-empted HARQ process for the $2^{nd}$ downlink transmission at 41. This HPPI can be transmitted in the Downlink Grant (DCI) scheduling the $2^{nd}$ downlink transmission (e.g. URLLC PDSCH).

In another embodiment, after the gNB pre-empts a HARQ process with HPPI signalling, as discussed above, the gNB instructs the UE to resume the pre-empted HARQ transmission. That is, after the $1^{st}$ downlink transmission (e.g. eMBB PDSCH) HARQ process has been pre-empted for use of a $2^{nd}$ downlink transmission (e.g. URLLC PDSCH), as discussed above (see also FIG. 13), the gNB signals a "Resume HARQ Process" indicator at 42 in FIG. 13 to the pre-empted HARQ process so that the UE would resume processing of the HARQ retransmission of the $1^{st}$ downlink transmission. This Resume HARQ Process indicator can be signalled in the DL grant (DCI) scheduling the retransmission for the $1^{st}$ downlink transmission.

Figure 14:
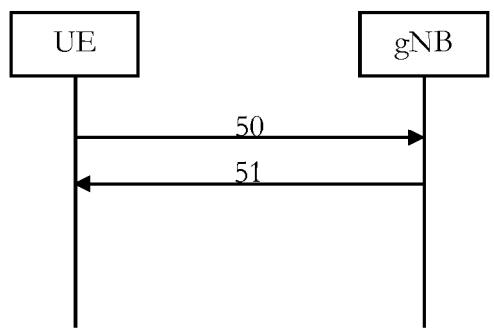
FIG. 14 illustrates an embodiment where a HARQ Process is resumed after pre-emption.

In another embodiment, the UE managing a HARQ retransmission of a $1^{st}$ downlink transmission (e.g. eMBB PDSCH) may use some of the soft buffer for the $1^{st}$ downlink transmission to accommodate a $2^{nd}$ downlink transmission (e.g. URLLC PDSCH), wherein the $2^{nd}$ downlink transmission has a higher priority than the $1^{st}$ downlink transmission. Here, the UE may run out of soft buffer to cater for an urgent URLLC PDSCH and hence it would pre-empt some soft buffer memory from the existing HARQ transmission so that it could service the URLLC PDSCH first. As illustrated in FIG. 14, the UE then signals at 50 to the network (e.g. gNB) (e.g. in PUCCH feedback signalling), which HARQ process it has pre-empted. The gNB is then able to take into account this UE-based soft-buffer pre-emption when determining what to re-transmit at 51 (in the pre-empted eMBB transmission) to the UE.

As becomes apparent from the discussion herein, the prior art basically pertains to cases where the resources used for URLLC pre-empt in time and/or frequency those used for eMBB, wherein the present disclosure pertains also to cases where, for example, the URLLC processing pre-empts the processing resources used for eMBB.

Figure 15:
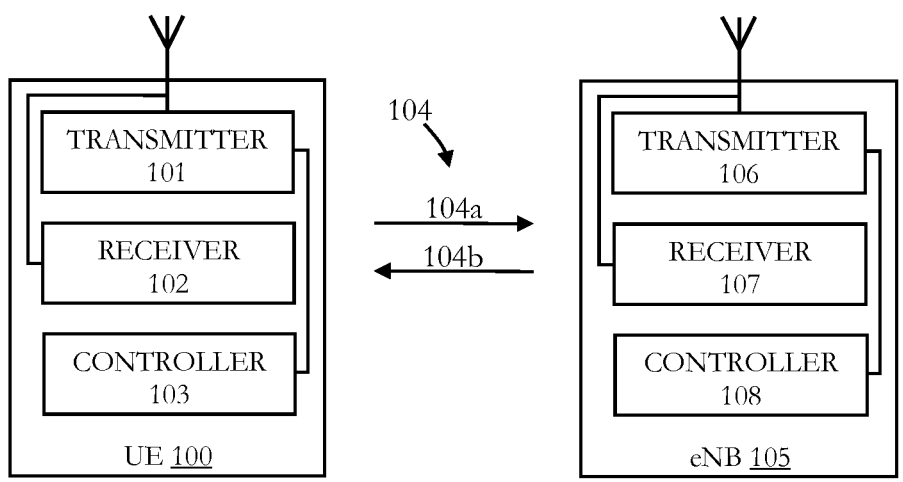
FIG. 15 schematically illustrates a user equipment and a base station.

An embodiment of an UE 100 and an eNB 105 (or NR eNB/gNB) and a communications path 104 between the UE 100 and the eNB 105, which are used for implementing embodiments of the present disclosure, is discussed under reference of FIG. 15.

The UE 100 has a transmitter 101, a receiver 102 and a controller 103, wherein, generally, the technical functionality of the transmitter 101, the receiver 102 and the controller 103 are known to the skilled person, and, thus, a more detailed description of them is omitted.

The eNB 105 has a transmitter 106, a receiver 107 and a controller 108, wherein also here, generally, the functionality of the transmitter 106, the receiver 107 and the controller 108 are known to the skilled person, and, thus, a more detailed description of them is omitted.

The communication path 104 has an uplink path 104a, which is from the UE 100 to the eNB 105, and a downlink path 10b, which is from the eNB 105 to the UE 100.

During operation, the controller 103 of the UE 100 controls the reception of downlink signals over the downlink path 104b at the receiver 102 and the controller 103 controls the transmission of uplink signals over the uplink path 104a via the transmitter 101.

Similarly, during operation, the controller 108 of the eNB 105 controls the transmission of downlink signals over the downlink path 104b over the transmitter 106 and the controller 108 controls the reception of uplink signals over the uplink path 104a at the receiver 107.

Figure 16:
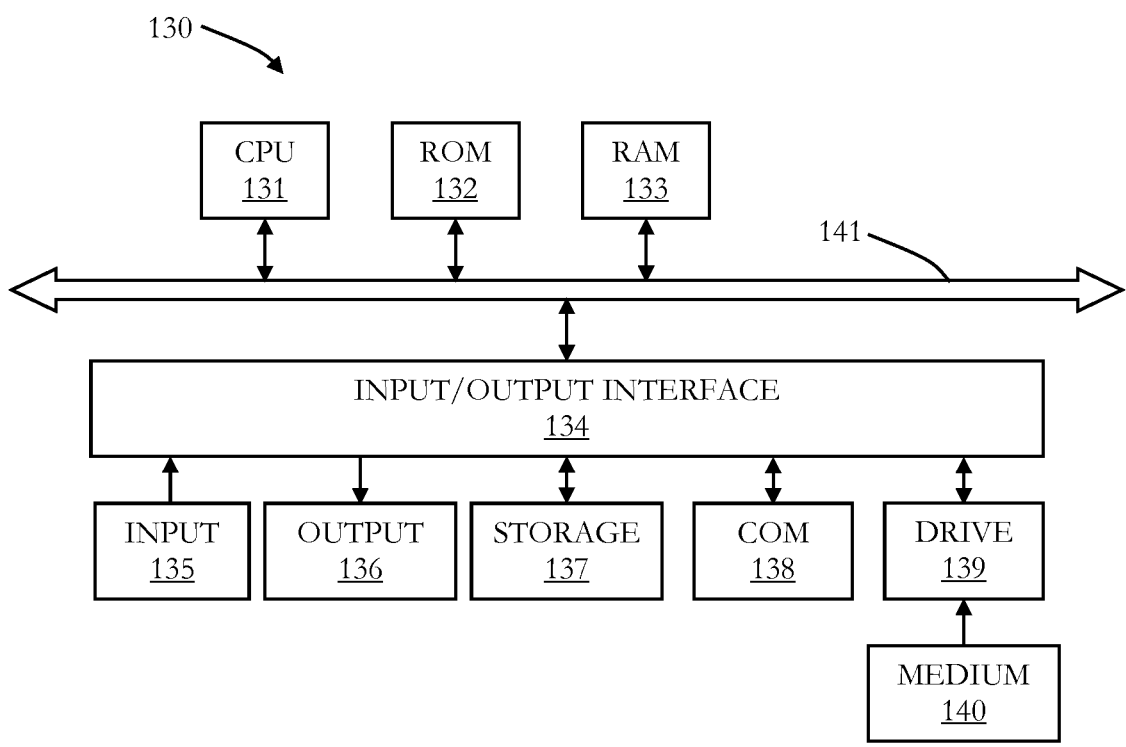
FIG. 16 illustrates a multi-purpose computer which can be used for implementing a user equipment or a base station.

In the following, an embodiment of a general purpose computer 130 is described under reference of FIG. 16. The computer 130 can be implemented such that it can basically function as any type of base station or new radio base station, transmission and reception point, or user equipment as described herein. The computer has components 131 to 141, which can form a circuitry, such as any one of the circuitries of the base stations, and user equipments, as described herein.

Embodiments which use software, firmware, programs or the like for performing the methods as described herein can be installed on computer 130, which is then configured to be suitable for the concrete embodiment.

The computer 130 has a CPU 131 (Central Processing Unit), which can execute various types of procedures and methods as described herein, for example, in accordance with programs stored in a read-only memory (ROM) 132, stored in a storage 137 and loaded into a random access memory (RAM) 133, stored on a medium 140 which can be inserted in a respective drive 139, etc.

The CPU 131, the ROM 132 and the RAM 133 are connected with a bus 141, which in turn is connected to an input/output interface 134. The number of CPUs, memories and storages is only exemplary, and the skilled person will appreciate that the computer 130 can be adapted and configured accordingly for meeting specific requirements which arise, when it functions as a base station or as user equipment.

At the input/output interface 134, several components are connected: an input 135, an output 136, the storage 137, a communication interface 138 and the drive 139, into which a medium 140 (compact disc, digital video disc, compact flash memory, or the like) can be inserted.

The input 135 can be a pointer device (mouse, graphic table, or the like), a keyboard, a microphone, a camera, a touchscreen, etc.

The output 136 can have a display (liquid crystal display, cathode ray tube display, light emittance diode display, etc.), loudspeakers, etc.

The storage 137 can have a hard disk, a solid state drive and the like.

The communication interface 138 can be adapted to communicate, for example, via a local area network (LAN), wireless local area network (WLAN), mobile telecommunications system (GSM, UMTS, LTE, NR etc.), Bluetooth, infrared, etc.

It should be noted that the description above only pertains to an example configuration of computer 130. Alternative configurations may be implemented with additional or other sensors, storage devices, interfaces or the like. For example, the communication interface 138 may support other radio access technologies than the mentioned UMTS, LTE and NR.

When the computer 130 functions as a base station, the communication interface 138 can further have a respective air interface (providing e.g. E-UTRA protocols OFDMA (downlink) and SC-FDMA (uplink)) and network interfaces (implementing for example protocols such as S1-AP, GTP-U, S1-MME, X2-AP, or the like). Moreover, the computer 130 may have one or more antennas and/or an antenna array. The present disclosure is not limited to any particularities of such protocols.

The methods as described herein are also implemented in some embodiments as a computer program causing a computer and/or a processor and/or circuitry to perform the method, when being carried out on the computer and/or processor and/or circuitry. In some embodiments, also a non-transitory computer-readable recording medium is provided that stores therein a computer program product, which, when executed by a processor and/or circuitry, such as the processor and/or circuitry described above, causes the methods described herein to be performed.

It should be recognized that the embodiments describe methods with an exemplary order of method steps. The specific order of method steps is, however, given for illustrative purposes only and should not be construed as binding.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using a software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A user equipment for a mobile telecommunications system comprising circuitry configured to communicate with at least one base station, wherein the circuitry is further configured to:
interrupt processing of a lower priority data transmission when a higher priority data transmission has to be processed, when it is determined that an available processing power is below a predetermined threshold.

(2) The user equipment of (1), wherein the transmission of the lower priority data transmission is interrupted.

(3) The user equipment of (2), wherein the transmission of the lower priority data transmission is terminated.

(4) The user equipment of (2), wherein the transmission of the lower priority data transmission is postponed.

(5) The user equipment of (4), wherein resources for the postponed transmission of the lower priority data are scheduled by the at least one base station.

(6) The user equipment of (5), wherein the resources are scheduled based on at least one of: downlink control information, pre-empdon indicator.

(7) The user equipment of (6), wherein the downlink control information is associated with a short data transmission or a long data transmission.

(8) The user equipment of (4), wherein the postponed lower priority data transmission is transmitted in an uplink grant free resource.

(9) The user equipment of anyone of (1) to (8), wherein the circuitry is further configured to transmit a pre-emption indicator to the base station.

(10) The user equipment of (9), wherein the pre-emption indicator is transmitted when it is determined that the transmission of the lower priority data has failed in a scheduled resource due to processing of the higher priority data.

(11) The user equipment of (9) or (10), wherein the pre-emption indicator indicates for a multiple input multiple output transmission which stream of the multiple input multiple output transmission has been pre-empted by the higher priority data transmission.

(12) The user equipment of anyone of (1) to (11), wherein, when processing of lower priority data of multiple input multiple output transmission is interrupted, a stream of the multiple input multiple output transmission having the smallest transport block size is interrupted.

(13) The user equipment of anyone of (1) to (12), wherein the circuitry is further configured to transmit a pre-emption indicator in a physical uplink control channel.

(14) The user equipment of (13), wherein the pre-emption indicator is transmitted when it is determined that a physical downlink shared channel has been pre-empted by the high priority data transmission.

(15) The user equipment of (14), wherein the pre-emption indicator is transmitted when it is determined that the time interval for processing of the physical downlink shared channel is larger than the time interval between the physical downlink shared channel and its corresponding hybrid automatic repeat request feedback.

(16) The user equipment of (15), wherein the pre-emption indicator is transmitted instead of a NACK feedback.

(17) The user equipment of anyone of (1) to (16), wherein the circuitry is further configured to delay a hybrid automatic repeat request feedback for a physical downlink shared channel.

(18) The user equipment of (17), wherein the hybrid automatic repeat request feedback is delayed when it is determined that a time interval for processing of the physical downlink shared channel carrying the low priority data transmission is larger than a time interval between the physical downlink shared channel and its corresponding hybrid automatic repeat request feedback for a scheduled physical uplink control channel.

(19) The user equipment of anyone of (1) to (18), wherein the circuitry is further configured to at least partially buffer the high priority data in a buffer being used for the low priority data transmission.

(20) A base station for a mobile telecommunications system comprising circuitry configured to communicate with at least one user equipment, wherein the circuitry is further configured to:
determine, based on a processing power of the at least one user equipment for a lower priority data transmission scheduled for a first transmission slot, whether the at least one user equipment is able to transmit the lower priority data in the scheduled transmission slot; and
decode a second transmission slot, based on the determination result and when it is determined that a higher priority data transmission is scheduled for the at least one user equipment.

(21) A base station for a mobile telecommunications system comprising circuitry configured to communicate with at least one user equipment, wherein the circuitry is further configured to:
determine, based on an indication received from the at least one user equipment, that a scheduled lower priority data transmission from the at least one user equipment failed, wherein processing of the lower priority data transmission is pre-empted by processing of a higher priority data transmission.
(22) The base station of (21), wherein the indication is a processing pre-emption indicator.
(23) The base station of (21), wherein the indication is received in a higher priority data transmission.
(24) The base station of (21), wherein the indication is received in a physical uplink control channel.
(25) The base station of (24), wherein the physical uplink control channel is associated with resources for the lower priority data transmission.
(26) The base station of (21), wherein the indication is received in a scheduled physical uplink control channel.
(27) The base station of (26), wherein the indication is piggy-backed.
(28) The base station of (27), wherein the indication is piggy-backed on a hybrid automatic repeat request ACK for a physical downlink shared channel or a scheduling request.
(29) The base station of anyone of (21) to (28), wherein the circuitry is further configured to not decode the lower priority data transmission based on the determination that the scheduled lower priority data transmission from the at least one user equipment failed.
(30) A base station for a mobile telecommunications system comprising circuitry configured to communicate with at least one user equipment, wherein the circuitry is further configured to:
transmit a pre-emption indicator to the at least one user equipment for pre-empting a hybrid automatic repeat request process.
(31) The base station of (30), wherein the pre-emption indicator is a hybrid automatic repeat request process pre-emption indicator.
(32) The base station of (30) or (31), wherein the circuitry is further configured to resume the pre-empted hybrid automatic repeat request process, by transmitting a resume hybrid automatic repeat request process indicator to the at least one user equipment.
(33) A base station for a mobile telecommunications system comprising circuitry configured to communicate with at least one user equipment, wherein the circuitry is further configured to:
receive a pre-emption indicator from the at least one user equipment indicating that a hybrid automatic repeat request process has been pre-empted; and
determine, based on the pre-emption indicator, to perform a re-transmission of lower priority data to the at least one user equipment.
(34) A circuitry for a user equipment, in particular according to anyone of (1) to (19), for a mobile telecommunications system configured to communicate with at least one base station, wherein the circuitry is further configured to:
interrupt processing of a lower priority data transmission when a higher priority data transmission has to be processed, when it is determined that an available processing power is below a predetermined threshold.
(35) A circuitry for a base station for a mobile telecommunications system configured to communicate with at least one user equipment, wherein the circuitry is further configured to:
determine, based on a processing power of the at least one user equipment for a lower priority data transmission scheduled for a first transmission slot, whether the at least one user equipment is able to transmit the lower priority data in the scheduled transmission slot; and
decode a second transmission slot, based on the determination result and when it is determined that a higher priority data transmission is scheduled for the at least one user equipment.
(36) A circuitry for a base station for a mobile telecommunications system configured to communicate with at least one user equipment, wherein the circuitry is further configured to:
determine, based on an indication received from the at least one user equipment, that a scheduled lower priority data transmission from the at least one user equipment failed, wherein processing of the lower priority data transmission is pre-empted by processing of a higher priority data transmission.
(37) A circuitry for a base station for a mobile telecommunications system configured to communicate with at least one user equipment, wherein the circuitry is further configured to:
transmit a pre-emption indicator to the at least one user equipment for pre-empting a hybrid automatic repeat request process.
(38) A circuitry for a base station for a mobile telecommunications system configured to communicate with at least one user equipment, wherein the circuitry is further configured to:
receive a pre-emption indicator from the at least one user equipment indicating that a hybrid automatic repeat request process has been pre-empted; and
determine, based on the pre-emption indicator, to perform a re-transmission of lower priority data to the at least one user equipment.
(39) A mobile telecommunications system method for providing communication between at least one base station and at least one user equipment, comprising:
interrupting processing of a lower priority data transmission when a higher priority data transmission has to be processed, when it is determined that an available processing power is below a predetermined threshold.
(40) A mobile telecommunications system method for providing communication between at least one base station and at least one user equipment, comprising:
determining, based on a processing power of the at least one user equipment for a lower priority data transmission scheduled for a first transmission slot, whether the at least one user equipment is able to transmit the lower priority data in the scheduled transmission slot; and
decoding a second transmission slot, based on the determination result and when it is determined that a higher priority data transmission is scheduled for the at least one user equipment.
(41) A mobile telecommunications system method for providing communication between at least one base station and at least one user equipment, comprising:
determining, based on an indication received from the at least one user equipment, that a scheduled lower priority data transmission from the at least one user equipment failed, wherein processing of the lower priority data transmission is pre-empted by processing of a higher priority data transmission
(42) A mobile telecommunications system method for providing communication between at least one base station and at least one user equipment, comprising:
transmitting a pre-emption indicator to the at least one user equipment for pre-empting a hybrid automatic repeat request process.

(43) A mobile telecommunications system method for providing communication between at least one base station and at least one user equipment, comprising:

receiving a pre-emption indicator from the at least one user equipment indicating that a hybrid automatic repeat request process has been pre-empted; and determining, based on the pre-emption indicator, to perform a re-transmission of lower priority data to the at least one user equipment.

The invention claimed is:

1. A user equipment for a mobile telecommunications system comprising circuitry configured to communicate with at least one base station, wherein the circuitry is further configured to:

interrupt processing of a lower priority data transmission when a higher priority data transmission is required to begin processing prior to a scheduled transmission slot for the lower priority data transmission and under a condition that an available processing power to transmit the lower priority data transmission in the scheduled slot for the transmission of the lower priority data transmission is determined to be below a predetermined threshold.

2. The user equipment of claim 1, wherein the transmission of the lower priority data transmission is interrupted.

3. The user equipment of claim 2, wherein the transmission of the lower priority data transmission is terminated.

4. The user equipment of claim 2, wherein the transmission of the lower priority data transmission is postponed.

5. The user equipment of claim 4, wherein resources for the postponed transmission of the lower priority data are scheduled by the at least one base station.

6. The user equipment of claim 5, wherein the resources are scheduled based on at least one of: downlink control information, pre-emption indicator.

7. The user equipment of claim 6, wherein the downlink control information is associated with a short data transmission or a long data transmission.

8. The user equipment of claim 4, wherein the postponed lower priority data transmission is transmitted in an uplink grant free resource.

9. The user equipment of claim 1, wherein the circuitry is further configured to transmit a pre-emption indicator to the base station.

10. The user equipment of claim 9, wherein the pre-emption indicator is transmitted when it is determined that the transmission of the lower priority data has failed in a scheduled resource due to processing of the higher priority data.

11. The user equipment of claim 9, wherein the pre-emption indicator indicates for a multiple input multiple output transmission which stream of the multiple input multiple output transmission has been pre-empted by the higher priority data transmission.

12. The user equipment of claim 1, wherein, when processing of lower priority data of multiple input multiple output transmission is interrupted, a stream of the multiple input multiple output transmission having the smallest transport block size is interrupted.

13. The user equipment of claim 1, wherein the circuitry is further configured to transmit a pre-emption indicator in a physical uplink control channel.

14. The user equipment of claim 13, wherein the pre-emption indicator is transmitted when it is determined that a physical downlink shared channel has been pre-empted by the high priority data transmission.

15. The user equipment of claim 14, wherein the pre-emption indicator is transmitted when it is determined that the time interval for processing of the physical downlink shared channel is larger than the time interval between the physical downlink shared channel and its corresponding hybrid automatic repeat request feedback.

16. The user equipment of claim 15, wherein the pre-emption indicator is transmitted instead of a NACK feedback.

17. The user equipment of claim 1, wherein the circuitry is further configured to delay a hybrid automatic repeat request feedback for a physical downlink shared channel.

18. The user equipment of claim 17, wherein the hybrid automatic repeat request feedback is delayed when it is determined that a time interval for processing of the physical downlink shared channel carrying the low priority data transmission is larger than a time interval between the physical downlink shared channel and its corresponding hybrid automatic repeat request feedback transmitted in a scheduled physical uplink control channel.

19. The user equipment of claim 1, wherein the circuitry is further configured to at least partially buffer the high priority[7] data in a buffer being used for the low priority data transmission.

20. A base station for a mobile telecommunications system comprising circuitry configured to communicate with at least one user equipment, wherein the circuitry is further configured to:

determine, based on a processing power of the at least one user equipment for a lower priority data transmission scheduled for a first transmission slot, whether the at least one user equipment is able to transmit the lower priority data in the scheduled first transmission slot in light of identification that a higher priority data transmission is required to begin processing prior to the scheduled transmission slot for the lower priority data transmission; and decode a second transmission slot based on the determination result indicating that the at least one user equipment is not to be able to transmit the lower priority data in the scheduled first transmission slot and under a condition that the higher priority data transmission is scheduled for the at least one user equipment for the second transmission slot, without completing decoding of the first transmission slot associated with the lower priority data.

* * * * *